Patented July 15, 1930

1,770,414

UNITED STATES PATENT OFFICE

JEROME MARTIN AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF ESTERS

No Drawing.   Application filed March 26, 1928.   Serial No. 264,957.

Our invention relates to a process of preparing esters which comprises treating an ester with an alcohol in such a manner as to displace the basic radical of the ester and substitute in its place the basic radical of the alcohol employed. Our invention relates particularly to a process of producing butyl acetate from ethyl acetate and butyl alcohol.

An alcohol and an ester react in the presence of a catalyst according to the following equation:

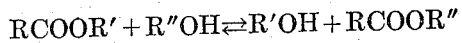

When R'OH and R"OH are two alcohols, the process is often termed alcoholysis or ester exchange. When, for example, ethyl acetate and butyl alcohol are allowed to react in this manner in the presence of a catalyst, such as concentrated sulphuric acid, butyl acetate and ethyl alcohol are formed.

The reaction, however, is a reversible one and does not go to completion unless some means of destroying the equilibrium is employed. In the present case, if a good yield of butyl acetate is desired, it becomes necessary to remove the ethyl alcohol from the reaction zone. In the past a number of methods have been recommended for this purpose. Our new process may be best illustrated by comparing it with processes which have previously been recommended.

Burghart (U. S. P. 1,491,076) prepared butyl acetate by mixing butyl alcohol, methyl acetate containing about 15% methyl alcohol, and a small amount of a catalyst such as sulphuric acid. On heating this mixture, butyl acetate is formed and a constant-boiling mixture composed of 18% methyl alcohol and 82% methyl acetate distilled over, thus eventually removing the methyl alcohol and allowing the reaction to go to completion. It is necessary to use a large excess of the methyl acetate in order to provide a sufficient amount to remove all of the methyl alcohol formed, since the material removed carries only about 3% more methyl alcohol than obtained in the methyl acetate added to the mixture. It is then necessary to separate part of the methyl alcohol from the methyl acetate removed by distillation before it can again be used in the process.

A process similar in many respects to that of Burghart is described by Steffens (U. S. P. 1,433,308). The latter describes a process for the production of esters by alcoholysis, for example, amyl acetate, which comprises reacting upon ethyl acetate with amyl alcohol so as to form amyl acetate and ethyl alcohol and removing a quantity of the ethyl alcohol by distillation in the form of a constant boiling mixture of the ethyl alcohol and the ethyl acetate, the process being carried out continuously by the continuous addition of the ethyl acetate and the amyl alcohol.

Neither of the processes described above provides for the separation into its components of the constant-boiling mixture of alcohol and ester removed during the course of the preparation of the ester being produced, a separation which is necessary if the former ester is to be returned to the process.

A convenient method of effecting the separation of the alcohol from the ester has been described by Mann (U. S. P. 1,541,430), who mixes the alcohol-containing ester with a mineral oil, preferably one having an initial boiling point of 325° C. or higher, and with water. The alcohol present is more soluble in the water than in the oil-ester mixture and as a result a separation takes place into an oil-ester layer and a water-alcohol layer. The two layers may be separated by any convenient method and the alcohol and ester recovered by distillation.

In attempting to prepare an ester such as butyl acetate by alcoholysis as described above, equilibrium is soon attained and the reaction stops unless some method of removing one of the products formed is provided. During equilibrium, considerable amounts of butyl alcohol, butyl acetate, ethyl alcohol, and ethyl acetate are present in the mixture. In order for the reaction to be carried to completion, either the butyl acetate or the ethyl alcohol must be removed from the mixture. Since butyl acetate boils at a temperature considerably higher than the ethyl alcohol, it is obviously impractical to attempt to remove it from the mixture by distillation. The removal of the ethyl alcohol by distillation likewise is difficult since ethyl alcohol boils at a temperature slightly above the ethyl acetate. These two liquids form a constant-boiling mixture containing 31% of ethyl alcohol and 69% of ethyl acetate, which boils at a temperature lower than either of the pure compounds and it readily becomes apparent that to remove the ethyl alcohol formed it is necessary to have present a very large excess of ethyl acetate. When water is present in the mixture and distillation is attempted, a ternary mixture composed of 8.4% ethyl alcohol, 9% water, and 82.6% ethyl acetate passes over at 70.2° C. It is evident then that the distillation of such a mixture serves to concentrate the ethyl alcohol in the reaction vessel, a result directly contrary to that which is desired.

If, however, water and another material such as xylol, toluol, benzol, mesitylene, or other hydrocarbon immiscible with water and having a boiling point considerably different from that of the ester being used, is added to the reaction mixture, a ready method of separation becomes available. The water and the hydrocarbon added to the reaction mixture act somewhat as selective solvents, the hydrocarbon taking up the greater portion of the ethyl acetate and butyl alcohol, and the water, the ethyl alcohol. As a result of such action, the ethyl alcohol is removed from the zone of reaction and the reaction may then go to completion. When, for example, one volume of an ethyl alcohol solution containing approximately 10% ethyl acetate is mixed with two volumes of water and one volume of xylol, two layers are formed. The upper layer has about 1.1 times the volume of xylol used and is of approximately the following composition:

|  | Per cent |
|---|---|
| Water | 1.8 |
| Ethyl alcohol | 2.0 |
| Ethyl acetate | 5.9 |
| Xylol | 90.3 |

The lower layer has about 2.9 times the volume of the alcohol-ester solution and analyzes approximately as follows:

|  | Per cent |
|---|---|
| Water | 68.3 |
| Ethyl alcohol | 30.1 |
| Ethyl acetate | 1.3 |
| Xylol | .3 |

We have also found that when butyl alcohol and butyl acetate are present in the system there is likewise a tendency for these compounds to remain in the hydrocarbon layer just as in the case of ethyl acetate. Such a system therefore serves essentially the desired object of retaining the ethyl acetate, butyl alcohol and butyl acetate within the same reaction zone while at the same time confining in a separate zone the ethyl alcohol formed during the reaction.

Our process of preparing esters by alcoholysis may be best illustrated by means of a specific example such as the preparation of butyl acetate from butyl alcohol and ethyl acetate. For this purpose the following materials are taken:

1 volume butyl alcohol;
1.6 volume of a mixture composed of approximately 85% ethyl acetate and 15% ethyl alcohol;
3 volumes water;
0.45 volume sulphuric acid (catalyst);
3 volumes of a petroleum hydrocarbon boiling at 200°–250° C.

On mixing, a hydrocarbon and a water layer are formed, the former taking up most of the butyl alcohol and ethyl acetate, and the latter, most of the ethyl alcohol. The mixture is refluxed and the butyl alcohol and ethyl acetate react to form butyl acetate and ethyl alcohol. The latter compound passes into the water layer and is thus withdrawn from the reaction zone so that further reaction can take place. After ½ to 3 hours refluxing, the ethyl acetate will be almost completely converted to butyl acetate and ethyl alcohol. The ethyl alcohol will be largely in the water layer, while the butyl acetate will be almost altogether in the hydrocarbon layer.

The separation of the components of the resulting mixture may be effected in a number of ways. For example, the water layer may be drawn off from the reaction kettle and the hydrocarbon layer remaining behind subjected to fractional distillation. The hydrocarbon layer, in addition to butyl acetate and butyl alcohol, contains small amounts of ethyl acetate, ethyl alcohol and water. The latter compounds, however, are readily removed by distillation, due both to their own low boiling points and to the still lower boiling point of the ternary constant-boiling mixture they form. These compounds should all distil over at less than 85° C., thereby leaving only a dry mixture of butyl acetate and butyl alcohol which distils off from the hydrocarbon at a considerably higher temperature. A small amount of butyl alcohol will be present with the butyl acetate but this will be approximately 15%—the amount ordinarily present in commercial butyl acetate. The hydrocarbon may be left in the still for use in preparing a second charge of butyl acetate, or if desired it may be removed and the same still used for the separation of the ethyl alcohol from the water layer. The ethyl alcohol may be removed by distillation and used as such or reconverted to ethyl acetate for use again in the preparation of butyl acetate. The water-sulphuric acid mixture left after the removal of the ethyl alcohol may also be used again in the process.

Excellent yields are obtained in our new process, the only losses being those occurring during distillation. As has been shown above, the hydrocarbon, sulphuric acid, water, and ethyl alcohol remaining at the end of an operation may all be again used in the same process, all except the latter, without further treatment. The ethyl alcohol may be used as such or it may be converted to ethyl acetate and the latter used in the further production of butyl acetate. In addition, our new process possesses other very important advantages over processes which have previously been recommended for the production of esters by alcoholysis. In previous processes it has been necessary to use large excesses of ethyl acetate; we make use of only a comparatively small excess over the amount theoretically required. In former processes, it has been necessary to remove by distillation the alcohol formed during the reaction as a component of a constant-boiling mixture. This has required the use of large amounts of steam and the reaction is only carried to completion as the alcohol is slowly removed from the reaction mixture. Consequently, it has taken fairly long periods of time to complete a charge. By our improved process we are able to complete a charge, regardless of its size, in a comparatively short length of time—one-half to three hours—and only moderate amounts of steam are required, only enough being used to distil off the low-boiling materials. Due to the very appreciable savings in steam, time and equipment required, we are able to produce esters at considerably lower costs than has previously been the case. We are also able to use wet materials in our process. In other processes, it has been necessary to use practically anhydrous materials. Former processes have been restricted to the use of pure esters or alcohol solutions very rich in esters. Our process is not limited in this way; we can, with suitable conditions, readily employ ester solutions of ester content as low as 35%. Another advantage of our process is that the alcohol formed during the reaction is recovered substantially free of ester and is therefore directly adapted to reconversion to ester by any method. Still another advantage in favor of our process is the simplicity of design of distilling apparatus required. In our process, the differences between the boiling points of the components to be separated by fractionation are in every case fairly large and consequently the simplest kind of apparatus may be employed.

In the example cited above, we have used sulphuric acid as the catalyst. Also, other catalysts may be used instead of sulphuric acid such as other mineral acids, for example hydrochloric acid or phosphoric acid. Instead of a petroleum fraction boiling preferably at 200°–250° C., we can use other water-immiscible hydrocarbons that are solvents for ethyl acetate, butyl acetate and butyl alcohol; have a boiling point somewhat above that of butyl actate; and do not form constant-boiling mixtures with any of the products of the reaction. We may also vary the relative amounts of the materials employed and do not confine ourselves to the use of the exact amounts shown in the example cited above.

Our new process is applicable to the preparation of other esters than butyl actate. For example, we may apply it to the preparation of amyl acetate from amyl alcohol and ethyl acetate. In place of the ethyl acetate we may use other esters such as methyl acetate, methyl propionate, ethyl butyrate, ethyl propionate, ethyl valerate, ethyl tartrate, ethyl oxalate, propyl acetate, propyl butyrate, propyl propionate, propyl valerate, propyl tartrate, or propyl oxalate, the essential points being that the alcohol entering the reaction be weakly water soluble, and the alcohol formed in the reaction be strongly water soluble. It is understood, of course, that the character and amount of the hydrocarbon used in our process is determined to some extent by the nature of the raw materials used and the esters being prepared, it being essential that the greater portion of both the ester and alcohol used as raw materials, and the ester formed by the reaction, be retained in the hydrocarbon layer and also that a constant-boiling mixture not be formed with any of the materials present.

Now having described our invention, what we claim is:

1. The process of preparing an ester which comprises reacting a weakly water-soluble alcohol with an ester of a strongly water-soluble alcohol in the presence of water and a water-immiscible hydrocarbon having a boiling point in excess of that of the ester formed by the reaction, and which is a solvent for the said alcohol and ester and the ester formed by the reaction but not for the alcohol formed during the reaction.

2. The process of preparing an ester which comprises reacting a weakly water-soluble alcohol with an ester of a strongly water-soluble alcohol in the presence of water and a water-immiscible hydrocarbon which is a solvent for the said alcohol and ester, and the ester formed by the reaction, but not for the alcohol formed during the reaction.

3. The process of preparing an ester which comprises reacting a weakly water-soluble alcohol with an ester of a strongly water-soluble alcohol in the presence of water and a water-immiscible hydrocarbon which is a solvent for the said alcohol and ester and the ester formed by the reaction but not for the alcohol formed during the reaction, separating the resulting water layer from the hydrocarbon layer and finally separating the ester formed by fractionally distilling the hydrocarbon fraction.

4. The process of preparing an ester which comprises reacting a weakly water-soluble alcohol with an ester of a strongly water-soluble alcohol in the presence of water and a water-immiscible hydrocarbon having a boiling point in excess of that of the ester formed by the reaction and which is a solvent for the said alcohol and ester and the ester formed by the reaction but not for the alcohol formed during the reaction, separating the resulting water layer from the hydrocarbon layer, and finally separating the ester formed by fractionally distilling the hydrocarbon fraction.

5. The process of preparing butyl acetate which comprises reacting butyl alcohol with ethyl acetate in the presence of water and a water-immiscible hydrocarbon having a boiling point in excess of that of the said butyl acetate and which is a solvent for the said butyl alcohol, butyl acetate and ethyl acetate but not for the ethyl alcohol formed during the reaction.

6. The process of preparing butyl acetate which comprises reacting butyl alcohol with ethyl acetate in the presence of water and a water-immiscible hydrocarbon which is a solvent for the said butyl alcohol, butyl acetate and ethyl acetate but not for the ethyl alcohol formed during the reaction.

7. The process of preparing butyl acetate which comprises reacting butyl alcohol with ethyl acetate in the presence of water and a water-immiscible hydrocarbon which is a solvent for the said butyl alcohol, butyl acetate and ethyl acetate but not for the ethyl alcohol formed during the reaction, separating the resulting water layer from the hydrocarbon layer, and finally separating the butyl acetate by fractionally distilling the hydrocarbon fraction.

8. The process of preparing butyl acetate which comprises reacting butyl alcohol with ethyl acetate in the presence of water and a water-immiscible hydrocarbon having a boiling point in excess of that of the said butyl acetate and which is a solvent for the said butyl alcohol, butyl acetate and ethyl acetate but not for the ethyl alcohol formed during the reaction, separating the resulting water from the hydrocarbon layer, and finally separating the butyl acetate by fractionally distilling the hydrocarbon fraction.

9. The process of preparing butyl acetate which comprises reacting butyl alcohol with ethyl acetate in the presence of water and a petroleum hydrocarbon boiling at approximately 200°–250° C.

10. The process of preparing butyl acetate which comprises reacting butyl alcohol with ethyl acetate in the presence of water and a petroleum hydrocarbon boiling at approximately 200°–250° C., separating the resulting water layer from the said hydrocarbon layer, and finally separating the said butyl acetate by fractionally distilling the said hydrocarbon portion.

11. The process of preparing butyl acetate which comprises refluxing, with or without agitation, a mixture comprising 1 volume butyl alcohol, 1.6 volume of a mixture comprising approximately 85% ethyl acetate and 15% ethyl alcohol, 3 volumes water, 0.45 volume sulphuric acid, 3 volumes of a petroleum hydrocarbon boiling at approximately 200°–250° C., separating the resulting water layer from the said hydrocarbon layer, and finally recovering the said butyl acetate by fractionally distilling the said hydrocarbon portion.

12. In the preparation of an ester by allowing an ester of a strongly water-soluble alcohol to react with a weakly water-soluble alcohol, the step which comprises separating the alcohol formed from the ester formed by the addition of a mixture of water and a water-immiscible hydrocarbon which is substantially a non-solvent for the alcohol formed during the reaction but which is substantially a solvent for the other non-aqueous constituents present, refluxing the resulting mixture, separating the resulting water layer from the hydrocarbon layer, and finally removing the ester from the hydrocarbon fraction by fractional distillation.

13. In the preparation of butyl acetate by allowing ethyl acetate to react with butyl alcohol, the step which comprises separating the ethyl alcohol formed from the butyl acetate formed by the addition of a mixture of water and a water-immiscible hydrocarbon which is substantially a solvent for butyl alcohol, butyl acetate and ethyl acetate but which is substantially a non-solvent for the ethyl alcohol formed during the reaction, refluxing the resulting mixture, separating the resulting water layer from the hydrocarbon layer, and finally removing the butyl acetate from the hydrocarbon portion by fractional distillation.

In testimony whereof we affix our signatures.

JEROME MARTIN.
IGNACE J. KRCHMA.